United States Patent
Ko et al.

(10) Patent No.: US 10,801,562 B2
(45) Date of Patent: Oct. 13, 2020

(54) CLUTCH CONTROL METHOD

(71) Applicants: Hyundai Motor Company, Seoul (KR); Kia Motors Corporation, Seoul (KR)

(72) Inventors: Young Ho Ko, Yongin-si (KR); Ho Young Lee, Bucheon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 131 days.

(21) Appl. No.: 16/276,905

(22) Filed: Feb. 15, 2019

(65) Prior Publication Data

US 2020/0116217 A1 Apr. 16, 2020

(30) Foreign Application Priority Data

Oct. 10, 2018 (KR) ........................ 10-2018-0120671

(51) Int. Cl.
*F16D 48/06* (2006.01)
*F16D 48/02* (2006.01)
*F16D 29/00* (2006.01)

(52) U.S. Cl.
CPC ........... *F16D 48/066* (2013.01); *F16D 25/14* (2013.01); *F16D 29/005* (2013.01);
(Continued)

(58) Field of Classification Search
CPC .. F16D 48/062; F16D 48/066; F16D 48/0206; F16D 25/00–25/14;
(Continued)

(56) References Cited

U.S. PATENT DOCUMENTS 8,577,571 B2 * 11/2013 Einfinger ............. F16D 48/066
 701/67
9,279,464 B2 * 3/2016 Trutschel ............. F16D 48/02
(Continued)

FOREIGN PATENT DOCUMENTS

JP 2012-121495 A 6/2012
KR 10-2014-0059613 A 5/2014
(Continued)

*Primary Examiner* — Erin D Bishop
(74) *Attorney, Agent, or Firm* — Morgan, Lewis & Bockius LLP

(57) ABSTRACT

A clutch control method may include generating a current-hydraulic pressure model by obtaining an increasing slope of a measured hydraulic pressure which is applied to a clutch in accordance with an increase of a primary ramp current while applying the primary ramp current to a solenoid valve that controls hydraulic pressure to be supplied to the clutch; obtaining a difference between a virtual hydraulic pressure according to the current-hydraulic pressure model and a measured hydraulic pressure applied to the clutch for a secondary ramp current while applying the secondary ramp current to the solenoid valve after removing the primary ramp current; performing updating by learning a secondary ramp current, at which the difference between the virtual hydraulic pressure and the measured hydraulic pressure is maximum, as a Volumetric Kiss Point (VKP); and controlling the clutch on the basis of the learned VKP.

8 Claims, 4 Drawing Sheets

(52) U.S. Cl.
CPC .............. *F16D 48/0206* (2013.01); *F16D 2500/50251* (2013.01); *F16D 2500/7082* (2013.01); *F16D 2500/70605* (2013.01)

(58) Field of Classification Search
CPC . F16D 2500/50251; F16D 2500/50245; F16D 2500/70605; F16D 2500/7082
See application file for complete search history.

(56) References Cited

U.S. PATENT DOCUMENTS

| | | |
|---|---|---|
| 9,587,685 B2 | 3/2017 | Bader et al. |
| 2010/0114443 A1 | 5/2010 | Terwart et al. |

FOREIGN PATENT DOCUMENTS

| | | |
|---|---|---|
| KR | 10-1585781 B1 | 1/2016 |
| KR | 10-2018-0069581 A | 6/2018 |

\* cited by examiner

US 10,801,562 B2

CLUTCH CONTROL METHOD

CROSS REFERENCE TO RELATED APPLICATION

The present application claims priority to Korean Patent Application No. 10-2018-0120671, filed Oct. 10, 2018, the entire contents of which is incorporated herein for all purposes by this reference.

BACKGROUND OF THE INVENTION

Field of the Invention

The present invention relates to a clutch control method and, more particularly, to a technology of controlling a hydraulic multiple disc clutch.

Description of Related Art

As shown in FIG. 1, according to a hydraulic multiple disc clutch, a plurality of clutch plates 500 and a plurality of clutch discs 502 alternately overlap each other between two rotation elements A and B, a piston 504 which is operated by hydraulic pressure implements an engaged state that transmits power by pressing the overlapping clutch plates 500 and clutch discs 502 in close contact with each other, and when the hydraulic pressure applied to the piston 504 is removed, the piston 504 is returned to the initial position by elasticity of a spring 506, so that the clutch plates 500 and the clutch discs 502 can rotate relative to each other in a disengaged state.

For reference, the hydraulic multiple disc clutch is simply referred to as a "clutch" hereafter.

Two clutches are shown in FIG. 1 and hydraulic pressure can be controlled to be supplied to the clutches. In the present configuration, a solenoid valve 510 which is controlled by a controller 508 can supply desired hydraulic pressure to the pistons 504 of the clutches by adjusting supplied line pressure and the hydraulic pressure supplied to the pistons 504 can be measured by hydraulic pressure sensors 512.

The hydraulic pressure which is controlled to be supplied to the clutches by the solenoid valve 510 has a tendency to be linearly proportioned to a control current that the controller 508 applies to the solenoid valve 510 except for some period.

The reason that the hydraulic pressure does not have linearity with the control current in some period is usually the structures of the clutches.

That is, when the control current of the solenoid valve 510 is slowly increased, the hydraulic pressure applied to the piston 504 of the clutch starts to linearly increase with the increase of the control current in the early stage in which the spring 506 of the clutch is not compressed, but as the hydraulic pressure keeps increasing, the piston 504 is moved and the spring 506 starts to be compressed. Accordingly, until the early-stage movement of the piston 504 is stopped by close contact of the clutch discs 502 and the clutch plates 500, a nonlinear hydraulic period is generated by a change in volume of a space to which the hydraulic pressure of the clutch is applied, and then linearity is recovered after the early-stage movement of the piston 504 is stopped.

Power transmission between the two rotation elements connected by the clutch is performed substantially at the point where the change in volume of the space to which the hydraulic pressure of the clutch is applied is finished and linearity is recovered by stop of the early-stage movement of the piston 504 due to close contact of the clutch discs 502 and the clutch plate 500. Accordingly, this point is defined as a Volumetric Kiss Point (VKP) and the solenoid valve 510 is controlled fundamentally in consideration of the VKP when the clutch is controlled.

Accordingly, it is preferable for the controller 508 to learn the VKP as accurately as possible and control the clutch on the basis of the accurate VKP.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a clutch control method that can improve quickness and accuracy in clutch control by more rapidly and accurately learning the VKP of a hydraulic multiple disc clutch which is controlled by a solenoid valve.

In accordance with an aspect of the present invention, there is provided a clutch control method that may include: a model generating step in which a controller generates a current-hydraulic pressure model by obtaining an increasing slope of a measured hydraulic pressure which is applied to a clutch in accordance with an increase of a primary lamp current while applying the primary lamp current to a solenoid valve that controls hydraulic pressure to be supplied to the clutch; a difference obtaining step in which the controller obtains a difference between a virtual hydraulic pressure according to the current-hydraulic pressure model and a measured hydraulic pressure applied to the clutch for a secondary lamp current while applying the secondary lamp current to the solenoid valve after removing the primary lamp current; a learning step in which the controller performs updating by learning a secondary lamp current, at which the difference between the virtual hydraulic pressure and the measured hydraulic pressure is maximum, as a Volumetric Kiss Point (VKP); and a clutch control step in which the controller controls the clutch on the basis of the learned VKP.

The hydraulic sensor may measure hydraulic pressure which is supplied to the clutch through the solenoid valve and the controller may receive the hydraulic pressure as input of the measured hydraulic pressure.

In the model generating step, the controller may generate the current-hydraulic pressure model by obtaining the slope of a measured hydraulic pressure according to an increase of the primary lamp current within a range in which the measured hydraulic pressure applied to the clutch exceeds a predetermined first reference hydraulic pressure in accordance with an increase of the primary lamp current.

The controller may perform the difference obtaining step only when the measured hydraulic pressure applied to the clutch is a predetermined second reference hydraulic pressure or less, and when the measured hydraulic pressure exceeds the second reference hydraulic pressure, the controller may perform the learning step.

The second reference hydraulic pressure may be set greater than the first reference hydraulic pressure.

According to an exemplary embodiment of the present invention, it is possible to improve quickness and accuracy in clutch control by more rapidly and accurately learning the VKP of a hydraulic multiple disc clutch which is controlled by a solenoid valve.

As described above, when a clutch is more rapidly and accurately controller, shifting by a transmission using the clutch is more appropriately performed, so shifting is rapidly performed with high response, which improves the commercial value of a vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
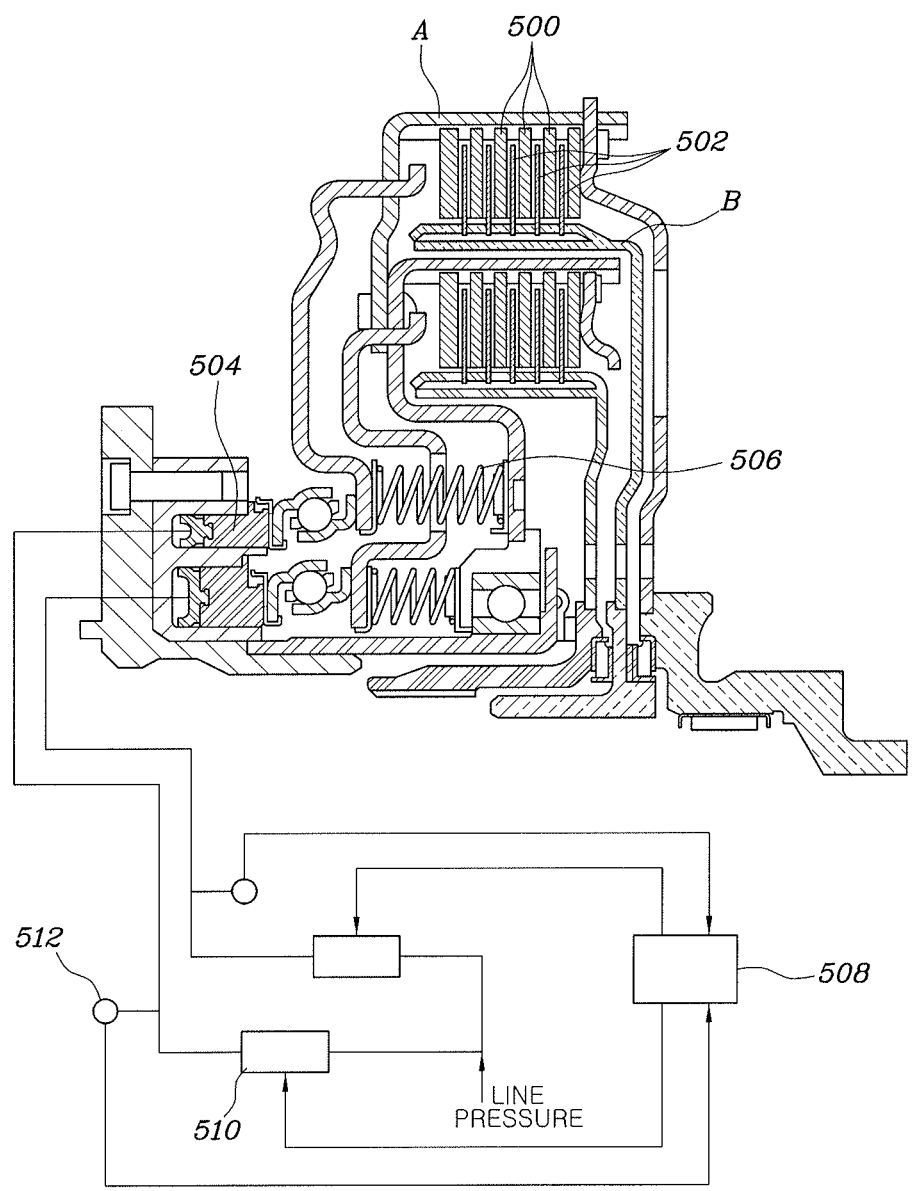
FIG. 1 is a view showing a hydraulic multiple disc clutch to which the present invention can be applied.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Figure 2:
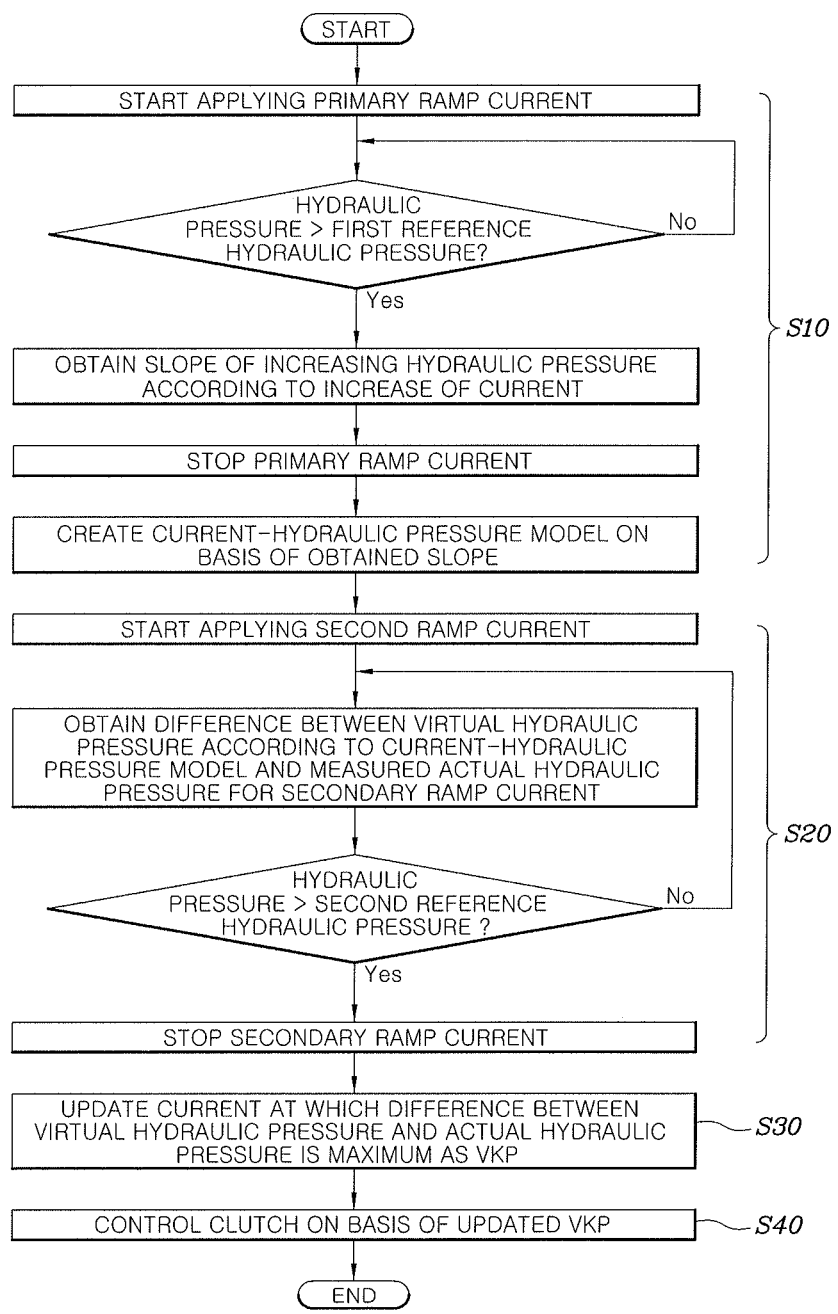
FIG. 2 is a flowchart showing an exemplary embodiment of a clutch control method according to an exemplary embodiment of the present invention.
Figure 3:
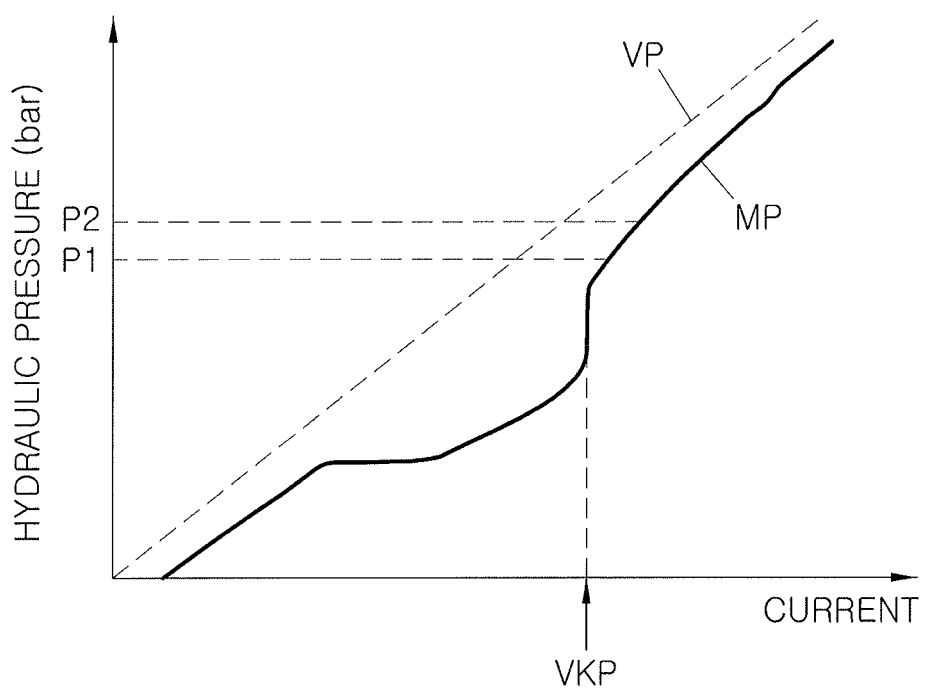
FIG. 3 and FIG. 4 are graphs showing a principle of learning a VKP according to an exemplary embodiment of the present invention.
Figure 4:
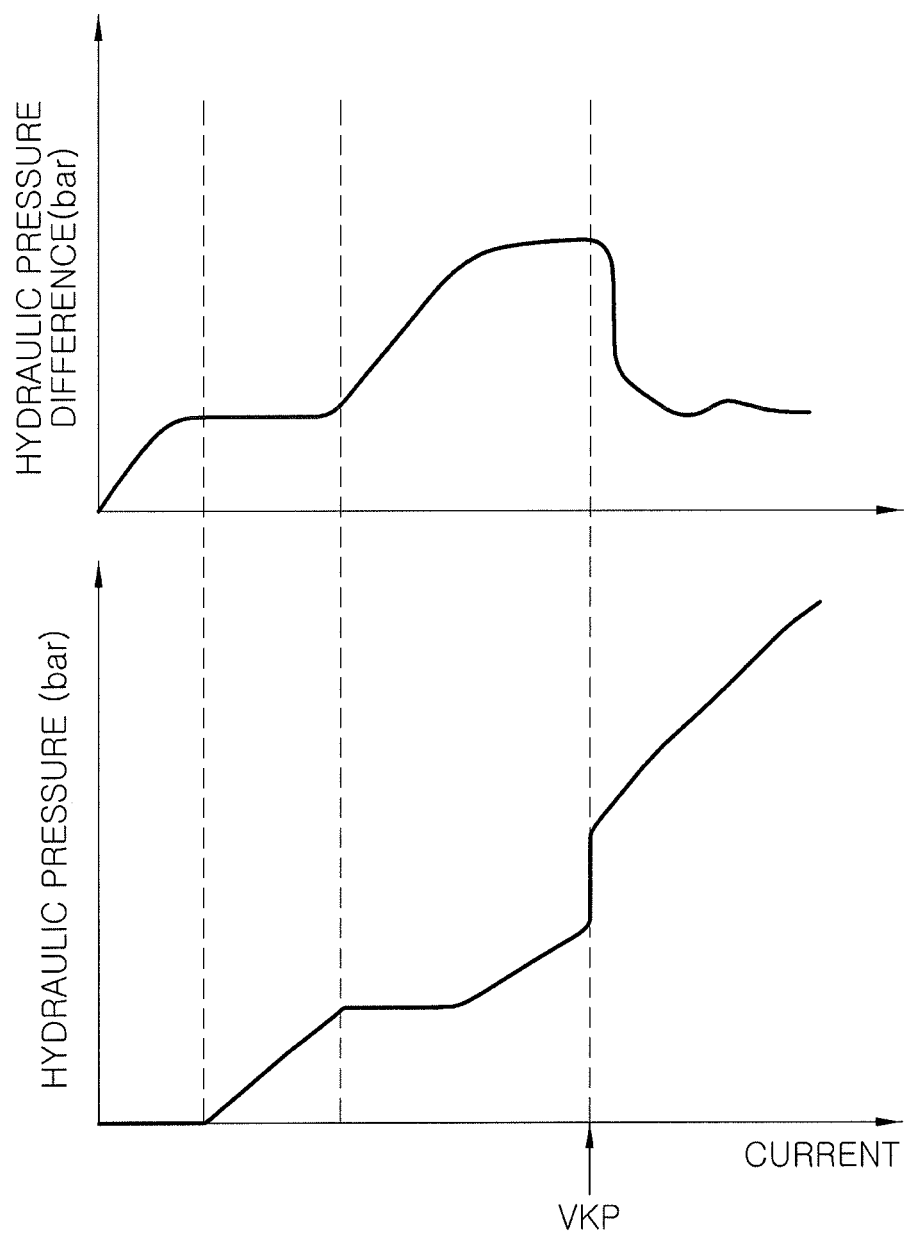

Referring to FIG. 2, FIG. 3 and FIG. 4, an exemplary embodiment of a clutch control method of the present invention includes: a model generating step (S10) in which a controller generates a current-hydraulic pressure model representing a relationship between a hydraulic pressure and a current by obtaining an increasing slope of a measured hydraulic pressure which is applied to a clutch in accordance with an increase of a primary ramp current while applying the primary ramp current to a solenoid valve that controls hydraulic pressure to be supplied to the clutch; a difference obtaining step (S20) in which the controller obtains the difference between a virtual hydraulic pressure according to the current-hydraulic pressure model and a measured hydraulic pressure applied to the clutch for a secondary ramp current while applying the secondary ramp current to the solenoid valve after removing the primary ramp current; a learning step (S30) in which the controller performs updating by learning a secondary ramp current, at which the difference between the virtual hydraulic pressure and the measured hydraulic pressure is maximum, as a Volumetric Kiss Point (VKP); and a clutch control step (S40) in which the controller controls the clutch on the basis of the learned VKP.

According to an exemplary embodiment of the present invention, the controller, to learn a VKP, generates a current-hydraulic pressure model while applying a primary ramp current to the solenoid valve, obtains the difference between a virtual hydraulic pressure according to the current-hydraulic pressure model and a measured hydraulic pressure measured by a hydraulic sensor while applying the secondary ramp current using the current-hydraulic pressure model, and then learns a secondary ramp current at the point where the difference is maximum as a VKP, by performing first the model generating step (S10). As such, the controller controls the clutch on the basis the newly learned VKP in the next process.

The hydraulic sensor measures hydraulic pressure which is supplied to the clutch through the solenoid valve and the controller receives the hydraulic pressure as input of the measured hydraulic pressure. That is, the hydraulic sensor shown in FIG. 1 measures the hydraulic pressure which is supplied to the clutch.

In the model generating step (S10), the controller generates the current-hydraulic pressure model by obtaining the slope of a measured hydraulic pressure according to an increase of the primary ramp current within a range in which the measured hydraulic pressure applied to the clutch exceeds a predetermined first reference hydraulic pressure in accordance with an increase of the primary ramp current.

That is, the controller finds out the slope of the measured hydraulic pressure by gradually increasing the primary ramp current up to a level where a predetermined slope of the measured hydraulic pressure can be found out in accordance with an increase of the primary ramp current while increasing the primary ramp current within a range exceeding the first reference hydraulic pressure.

Obviously, when the controller can find out a linear slope of a measured hydraulic pressure, as described above, the controller stops supplying the primary ramp current and generates the current-hydraulic pressure model on the basis of the found slope even if the measured hydraulic pressure does not reach maximum pressure yet.

The first reference hydraulic pressure is set greater than hydraulic pressure at a VKP averagely known for a corresponding model of clutch in the related art.

That is, the model generating step (S10) generates a current-hydraulic pressure model using linearity of hydraulic pressure which is applied to a clutch for current which is applied to a solenoid valve, so it is preferable to find out the relationship between a measured hydraulic pressure and a primary ramp current applied in a period in which linearity is secured to generate a more accurate current-hydraulic pressure model.

Accordingly, for example, when hydraulic pressure at an average VKP found out for a corresponding clutch through several experiments is 2.2 bar, it is preferable to set the first reference hydraulic pressure as about 2.5 bar with scope so that the model generating step (S10) is performed in a period in which a linear change of a measured hydraulic pressure for an applied primary ramp current is likely secured if it is the same model of clutch.

Referring to FIG. 3, it is preferable to set the first reference hydraulic pressure as P1, in which the current-hydraulic pressure model may be generated as an equation of a straight line based on the slope of hydraulic pressure that linearly increases with an increase of current within a range greater than P1.

In FIG. 3, a straight line VP is a virtual hydraulic pressure based on a current-hydraulic pressure model generated in the instant way and a line MP is a measured hydraulic pressure measured by a hydraulic sensor. In the line MP, as described above, there is a nonlinear period at the middle portion and the other period show behaviors almost similar to that of the straight line VP.

The line MP consequently changes from the nonlinear period to a linear period, as current increases. As shown in the figure, the line MP rapidly changes from the nonlinear period to the linear period and there is a tendency that the difference between a virtual hydraulic pressure and a measured hydraulic pressure is maximum immediately before the rapid change.

The present invention utilizes the tendency and current at the point where the difference between a virtual hydraulic pressure and a measured hydraulic pressure is maximum is set as a VKP.

The controller performs the difference obtaining step (S20) only when the measured hydraulic pressure applied to the clutch is a predetermined second reference hydraulic pressure or less, and when the measured hydraulic pressure exceeds the second reference hydraulic pressure, the controller stops the difference obtaining step (S10) and immediately performs the learning step (S30).

This is for rapidly finishing learning a VKP and sufficiently accurately learning the VKP, and it is preferable to set the second reference hydraulic pressure greater than the first reference hydraulic pressure, which is exemplified as P2 in FIG. 3.

That is, it is possible to accurately learn a VKP only when the second reference hydraulic pressure is set such that a nonlinear change of the measured hydraulic pressure that occurs when a secondary ramp current is applied to a solenoid valve is definitely ended. Accordingly, when the second reference hydraulic pressure is set slightly greater than the first reference hydraulic pressure, it is secured that the nonlinear change period of the measured hydraulic pressure has been finished, and it is not needed to perform the difference obtaining step (S20) until the measured hydraulic pressure reaches a maximum pressure. Therefore, it is possible to secure accuracy in learning a VKP and rapidly learn the VKP.

Obviously, according to the present purpose, it would be preferable to set the second reference hydraulic pressure slightly greater than the first reference hydraulic pressure and smaller than the maximum of the measured hydraulic pressure. For example, when the first reference hydraulic pressure is 2.5 bar, the second reference hydraulic pressure may be set 2.75 which is 10% point higher than the first reference hydraulic pressure.

For reference, FIG. 4 is a graph showing tendencies of the virtual hydraulic pressure and the measured hydraulic pressure and the difference between them.

After learning a VKP of a clutch in the method described above, the controller controls the clutch using the VKP in the next clutch control process.

For example, when control of engaging the clutch is performed, a solenoid valve control current is rapidly increased up to the VKP accurately found out as described above so that the amount of fluid for providing hydraulic pressure to the clutch is rapidly supplied to the clutch. Accordingly, quick operation of the clutch is secured and excessive hydraulic pressure is not applied to the clutch till the VKP, so excessive engagement of the clutch is prevented. Thereafter, the solenoid valve control current is increased higher than the VKP, whereby the controller can control accurate clutch transmission torque to be controlled.

Obviously, the ability of accurately and rapidly controlling clutch transmission torque achieves more accurate and appropriate shifting performance of a transmission using the clutch, which contributes to quick and quiet shifting, and consequently, improving the commercial value of a vehicle.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:
1. A clutch control method comprising:
generating, by a controller, a current-hydraulic pressure model representing a relationship between a hydraulic pressure and a current by obtaining an increasing slope of a measured hydraulic pressure which is applied to a clutch in accordance with an increase of a primary ramp current while applying the primary ramp current to a solenoid valve that controls the hydraulic pressure to be supplied to the clutch;
obtaining, by the controller, a difference between a virtual hydraulic pressure according to the current-hydraulic pressure model and a measured hydraulic pressure applied to the clutch for a secondary ramp current while applying the secondary ramp current to the solenoid valve after removing the primary ramp current;
learning, by the controller, the secondary ramp current, at which a difference between the virtual hydraulic pressure and the measured hydraulic pressure is maximum, as a Volumetric Kiss Point (VKP); and
controlling, by the controller, the clutch on a basis of the learned VKP.

2. The clutch control method of claim 1, wherein a hydraulic sensor measures the hydraulic pressure which is supplied to the clutch through the solenoid valve and the controller is configured to receive the hydraulic pressure as input of the measured hydraulic pressure.

3. The clutch control method of claim 1, wherein, in the generating the current-hydraulic pressure model, the controller generates the current-hydraulic pressure model by obtaining the increasing slope of the measured hydraulic pressure according to the increase of the primary ramp current within a range in which the measured hydraulic pressure applied to the clutch exceeds a predetermined first reference hydraulic pressure in accordance with the increase of the primary ramp current.

4. The clutch control method of claim 3, wherein the controller performs the obtaining the difference between the virtual hydraulic pressure according to the current-hydraulic pressure model and the measured hydraulic pressure applied to the clutch for the secondary ramp current when the measured hydraulic pressure applied to the clutch is a predetermined second reference hydraulic pressure or less.

5. The clutch control method of claim 4, wherein when the measured hydraulic pressure exceeds the second reference hydraulic pressure, the controller performs learning the secondary ramp current.

6. The clutch control method of claim 4, wherein when the measured hydraulic pressure exceeds the predetermined second reference hydraulic pressure, the controller stops the secondary ramp current.

7. The clutch control method of claim 4, wherein the predetermined second reference hydraulic pressure is set greater than the predetermined first reference hydraulic pressure.

8. The clutch control method of claim 1, wherein the current-hydraulic pressure model is generated as a straight line based on an increasing slope of the hydraulic pressure that linearly increases with an increase of the current within a range greater than a predetermined first reference hydraulic pressure.

* * * * *